United States Patent Office 3,095,454
Patented June 25, 1963

3,095,454
TRIARYLPHOSPHINEDIHALOMETHYLENES
Gino Joseph Marco, Webster Groves, and Angelo John Speziale, Kirkwood, Mo., assignors to Monsanto Chemical Company, St. Louis, Mo., a corporation of Delaware
No Drawing. Filed Nov. 29, 1961, Ser. No. 155,817
14 Claims. (Cl. 260—606.5)

This invention relates to a new and useful class of compounds and to the preparation of same.

The compounds of this invention are phosphinedihalomethylenes of the formula

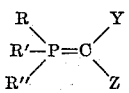

wherein Y is a halogen of atomic weight in the range of 35 to 80 (i.e. chlorine or bromine, but preferably chlorine), wherein Z is halogen of atomic weight in the range of 18 to 80 (i.e. fluorine, chlorine or bromine, but preferably chlorine), and wherein R, R' and R'' are like or unlike aromatic hydrocarbon radicals containing 6 to 12 carbon atoms (e.g. phenyl, tolyl, ethylphenyl, cumyl, butylphenyl, hexylphenyl, xylyl, cymyl, biphenylyl, indenyl, naphthyl, and the various isomeric forms thereof) or said aromatic hydrocarbon radicals having substituents on the aromatic ring such as fluorine, chlorine, bromine, lower alkoxy, nitro, amino ($NH_2$), mono(lower alkyl)amino and di(lower alkyl)amino. In general it is preferred that R, R' and R'' be aromatic hydrocarbon radicals containing 6 to 12 carbon atoms, particularly phenyl ($C_6H_5$).

The phosphinedihalomethylenes of this invention are prepared by reacting triaryl phosphine of the formula

wherein R, R' and R'' have the aforedescribed significance with dihalocarbene of the formula

wherein Y and Z have the above significance.

Dihalocarbenes of the foregoing formula are well known materials and methods for their preparation are described in vol. 78, p. 4496, of the Journal of the American Chemical Society. They are also prepared in an anhydrous system by (1) Reacting an anhydrous alkaline reagent such as an alkali metal lower alkoxide with a haloform of the formula

wherein Y and Z have the aforedescribed significance, wherein X is halogen of atomic weight in the range of 35 to 80 (i.e. chlorine or bromine) but wherein X is not of lower atomic weight than Y.

(2) Heating of haloforms of the formula

wherein X, Y and Z are the same as in (1) above in the presence of phenyl lithium.

(3) Heating salts of a haloacetic acid of the formula

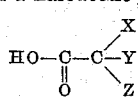

wherein X, Y and Z are the same as in (1) above.

(4) Heating esters of a haloacetic acid of the formula

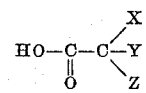

wherein X, Y and Z are the same as in (1) above in the presence of an alkali metal lower alkoxide.

The dihalocarbenes prepared by any of the above reactions, or other known methods, are unstable but when generated in situ and in the presence of a triaryl phosphine of the formula

wherein R, R' and R'' have the aforedescribed significance, they react spontaneously to form the phosphinedihalomethylenes of this invention.

The triaryl phosphines useful in preparing the phosphinedihalomethylenes of this invention include triphenyl phosphine and the various tritolyl phosphines, trixylyl phosphines, tricumyl phosphines, tri(biphenylyl) phosphines, tri(hexylphenyl) phosphines, trinaphthyl phosphines, tri(chlorophenyl) phosphines, tri(fluorophenyl) phosphines, tri(bromophenyl) phosphines, tri(methoxyphenyl) phosphines, tri(ethoxyphenyl) phosphines, tri(nitrophenyl) phosphines, tri(N,N-dimethylaminophenyl) phosphines, tri(N,N-diethylaminophenyl) phosphines, (phenyl)(dinaphthyl) phosphines, (naphthyl)(diphenyl) phosphines, (chlorophenyl)(diphenyl) phosphines, (methoxyphenyl)(diphenyl) phosphines, (chlorophenyl)(ditolyl) phosphines, etc., and like triaryl phosphines which satisfy the foregoing structural formula. The preferred triaryl phosphine reactants in the process of this invention are those of the foregoing structural formula wherein R, R' and R'' are like or unlike aromatic hydrocarbon radicals containing 6 to 12 carbon atoms, e.g. triphenyl phosphine, tri(1-naphthyl) phosphine, tri(4-methylphenyl) phosphine, (1-naphthyl)(diphenyl) phosphine, (4-methylhenyl)(diphenyl) phosphine and (phenyl)(di-4-methylphenyl) phosphine.

The aforedescribed dihalocarbene reactants of the process of this invention are generated in situ, and react immediately with the triaryl phosphine present to provide the phosphinedihalomethylenes of this invention. In that the phosphinedihalomethylenes of this invention are sensitive to moisture the process of this invention is preferably conducted in an anhydrous inert organic liquid media. Suitable inert liquid media include pentane, hexane, heptane, cyclohexane, benzene, toluene, xylene, and like liquid hydrocarbons and also diethyl ether, diisopropyl ether, tetrahydrofuran, and the like. In general in preparing the phosphinedihalomethylenes the procedure will involve mixing the triaryl phosphine reactant with the inert anhydrous organic liquid and gradually adding thereto the halogen containing precursor of the appropriate dihalocarbene reactant. While a wide range of reaction temperatures can be employed provided the system is fluid (i.e. a reaction temperature above the freezing point of the system up to and including the boiling point of the system) the optimum temperature will be that required to generate the dihalocarbene. The preferred reaction temperature is that which produces a substantially quantitative yield of dihalocarbene from the halogen containing precursor therefor and which enables a rapid and substantially complete reaction of the dihalocarbene and the triaryl phosphine.

To illustrate the preparation of the phosphinedihalomethylenes of this invention is the following:

*Example I*

To an ice-cooled (0–5° C.) reaction vessel containing 150 ml. of pentane, 26.2 grams of triphenyl phosphine and 11.2 grams of anhydrous potassium t-butoxide and while agitating is added 12 grams of chloroform over a period of thirty minutes. A yellow suspension results, the yellow solid dispersed therein is identified as triphenylphosphinedichloromethylene. Since this yellow solid reaction product is reactive with moisture it is preferably kept in suspension in the anhydrous inert organic liquid medium (pentane in this instance) and under a nitrogen atmosphere until used.

Upon adding di(4-chlorophenyl)ketone in the form of a diethyl ether solution thereof in the cold (0–5° C.) to the abovedescribed yellow suspension of Example I under a nitrogen atmosphere a suspension of triphenyl phosphine oxide and 1,1-di-(4-chlorophenyl)-2,2-dichloroethylene is obtained. Upon recovering 1,1-di(4-chlorophenyl)-2,2-dichloroethylene from this suspension and hydrochlorinating same the well known insecticide DDT is obtained.

The yellow suspension of Example I can be readily concentrated azeotropically distilling of the by-product t-butanol, the azeotrope in this instance being a t-butanol-pentane mixture.

*Example II*

To an ice-cooled (0–5° C.) reaction vessel containing 100 ml. of n-heptane, 26.2 grams of triphenyl phosphine, and 18.6 grams of an anhydrous equimolecular mixture of postassium t-butoxide and t-butanol, and while agitating is added 25.3 grams of bromoform over a period of 60 minutes. A yellow suspension results, the yellow solid dispersed therein is identified as triphenylphosphinedibromomethylene. The t-butanol (both added and by-product) is then distilled off under vacuum as an azeotrope with n-heptane. To protect triphenylphosphinedibromomethylene against the effects of moisture 150 ml. of n-heptane is mixed with the residue in the distilling flask.

*Example III*

To an ice-cooled (0–5° C.) reaction vessel containing 100 ml. of n-heptane, 26.2 grams of triphenyl phosphine, and 18.6 grams of an anhydrous equimolecular mixture of potassium t-butoxide and t-butanol, and while agitating is added 10.3 grams of dichlorofluoromethane over a period of 60 minutes. A yellow suspension results, the yellow solid dispersed therein is identified as triphenylphosphinechlorofluoromethylene.

*Example IV*

Employing the procedure of Example I but replacing triphenyl phosphine with an equimolecular amount of tri(1-naphthyl) phosphine there is obtained tri(1-naphthyl) phosphinedichloromethylene.

*Example V*

Employing the procedure of Example I but replacing chloroform with an equimolecular amount of dibromochloromethane there is obtained triphenylphosphinebromochloromethylene.

*Example VI*

Employing the procedure of Example I but replacing triphenyl phosphine with an equimolecular amount of tri-(4-methylphenyl) phosphine there is obtained tri(4-methylphenyl)phosphinedichloromethylene.

*Example VII*

Employing the procedure of Example I but replacing triphenyl phosphine with an equimolecular amount of tri-(4-chlorophenyl) phosphine there is obtained tri(4-chlorophenyl)phosphinedichloromethylene.

*Example VIII*

Employing the procedure of Example I but replacing chloroform with an equimolecular amount of dichlorobromomethane there is obtained triphenylphosphinedichloromethylene.

*Example IX*

Employing the procedure of Example II but replacing potassium t-butoxide with an equivalent weight of phenyl lithium (and also omitting t-butanol) there is obtained triphenylphosphinedichloromethylene.

*Example X*

Employing the procedure of Example I but replacing chloroform with an equimolecular weight of ethyl trichloroacetate there is obtained triphenylphosphinedichloromethylene.

*Example XI*

Upon mixing equimolecular amounts of triphenyl phosphine and sodium trichloroacetate in benzene and refluxing the mixture triphenylphosphinedichloromethylene is obtained.

Other phosphine dihalomethylenes obtained by the processes hereinbefore described include:

Tri(3-chlorophenyl)phosphinedichloromethylene
Tri(4-chlorophenyl)phosphinedibromomethylene
Tri(4-methoxyphenyl)phosphinedichloromethylene
Tri(3-methoxyphenyl)phosphinedibromomethylene
Tri(4-ethoxyphenyl)phosphinedichloromethylene
Tri[4-(N,N-dimethylamino)phenyl]phosphinedichloromethylene
Tri[4-(N,N-diethylamino)phenyl]phosphinedichloromethylene
Tri[4-(N-isopropylamino)phenyl]phosphinedichloromethylene
Tri(4-aminophenyl)phosphinedichloromethylene
Tri(3-methylphenyl)phosphinedichloromethylene
Tri(2,4-dimethylphenyl)phosphinedichloromethylene
Tri(4-isohexylphenyl)phosphinedichloromethylene
Tri(4-biphenylyl)phosphinedichloromethylene
Tri(4-bromophenyl)phosphinedibromomethylene
Tri(4-fluorophenyl)phosphinedichloromethylene
Tri(2,4-dichlorophenyl)phosphinedichloromethylene
(Diphenyl)(4-chlorophenyl)phosphinedichloromethylene
(Di-4-methylphenyl)(phenyl)phosphinedichloromethylene
(Diphenyl)(4-methoxyphenyl)phosphinedichloromethylene The phosphinedihalomethylenes have toxic effects on various animal organisms and have utility as agricultural toxicants in the control of insects, nematodes and fungi. The new compounds have additional utility as intermediates in the preparation of known compounds described in the Journal of the American Chemical Society, vol. 48, p. 3144 (1926), for example any of the aforedescribed phosphinedihalomethylenes upon reacting with benzophenone provide the corresponding 1,1-diphenyl-2,2-dihaloethylene

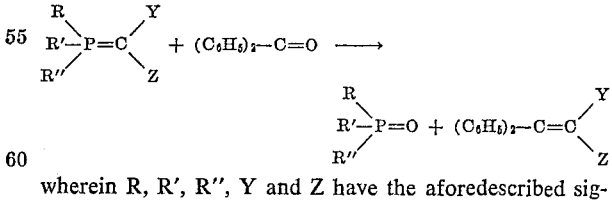

wherein R, R', R", Y and Z have the aforedescribed significance. To illustrate such is the following:

*Example A*

A reaction mass prepared as in Example I and containing 36.8 parts by weight of triphenylphosphinedichloromethylene is placed in a closed vessel equipped with a mechanical stirrer. Eighteen parts by weight of benzophenone dissolved in 50 parts of diethyl ether is added while maintaining the temperature between 0° C. and 5° C. A nitrogen atmosphere is maintained in the flask at all times. After stirring for 16 hours and filtering, the filtrate is evaporated to dryness. The residue is dissolved in a benzene hexane mixture and triphenylphosphine oxide precipitated. After filtering again, the filtrate is evaporated to dryness and the residue recrystallized from aqueous ethanol. A 46% yield of 1,1-dichloro-2,2-diphenyl ethylene (M.P. 79–80° C.) is obtained.

This application is a continuation-in-part of copending application Serial No. 862,481, filed December 29, 1959, and now abandoned.

What is claimed is:

1. A phosphinedihalomethylene of the formula

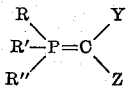

wherein Y is halogen of atomic weight in the range of 35 to 80, wherein Z is halogen of atomic weight in the range of 18 to 80, and wherein R, R' and R" are selected from the group consisting of aromatic hydrocarbon radicals containing 6 to 12 carbon atoms and said aromatic hydrocarbon radicals having substituents on the aromatic ring selected from the group consisting of fluorine, chlorine, bromine, lower alkoxy, nitro, amino, mono(lower alkyl)amino and di(lower alkyl)amino.

2. A phosphinedichloromethylene of the formula

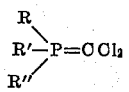

wherein R, R' and R" are aromatic hydrocarbon radicals containing 6 to 12 carbon atoms.

3. A triphenylphosphindedihalomethylene of the formula

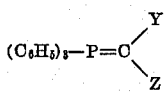

wherein Y is halogen of atomic weight in the range of 35 to 80 and wherein Z is halogen of atomic weight in the range of 18 to 80.

4. Triphenylphosphinedichloromethylene
5. Triphenylphosphinedibromomethylene
6. Tri(4-chlorophenyl)phosphinedichloromethylene
7. Tri(1-naphthyl)phosphinedichloromethylene
8. Tri(4-methylphenyl)phosphinedichloromethylene
9. The method of making a phosphinedihalomethylene of the formula

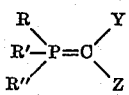

wherein Y is halogen of atomic weight in the range of 35 to 80, wherein Z is halogen of atomic weight in the range of 18 to 80, and wherein R, R' and R" are selected from the group consisting of aromatic hydrocarbon radicals containing 6 to 12 carbon atoms and said aromatic hydrocarbon radicals having substituents on the aromatic ring selected from the group consisting of fluorine, chlorine, bromine, lower alkoxy, nitro, amino, mono(lower alkyl)amino and di(lower alkyl)amino, which comprises reacting triaryl phosphine of the formula

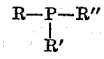

wherein R, R' and R" have the abovedescribed significance with dihalocarbene generated in situ in an inert anhydrous organic liquid medium, said dihalocarbene being of the formula

wherein Y and Z have the abovedescribed significance.

10. The method of making a phosphinedichloromethylene of the formula

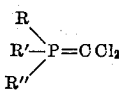

wherein R, R' and R" are aromatic hydrocarbon radicals containing 6 to 12 carbon atoms which comprises reacting triaryl phosphine of the formula

wherein R, R' and R" have the abovedescribed significance with dichlorocarbene (:CCl$_2$) generated in situ in an inert anhydrous organic liquid medium.

11. The method of making a triphenylphosphinedihalomethylene of the formula

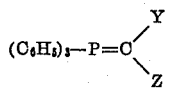

wherein Y is halogen of atomic weight in the range of 35 to 80 and wherein Z is halogen of atomic weight in the range of 18 to 80 which comprises reacting triphenyl phosphine with dihalocarbene generated in situ in an inert anhydrous organic liquid medium, said dihalocarbene being of the formula

wherein Y and Z have the abovedescribed significance.

12. The method of making triphenylphosphinedichloromethylene which comprises reacting triphenyl phosphine with dichlorocarbene (:CCl$_2$) generated in situ in an inert anhydrous organic liquid medium.

13. The method of making a triphenylphosphinedihalomethylene of the formula

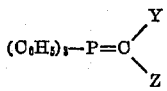

wherein Y is halogen of atomic weight in the range of 35 to 80 and wherein Z is halogen of atomic weight in the range of 18 to 80 which comprises adding a haloform of the formula

wherein Y and Z have the abovedescribed significance and wherein X is halogen of atomic weight in the range of 35 to 80 but wherein X is not of lower atomic weight than Y, to a suspension of triphenyl phosphine and an alkali metal lower alkoxide in an inert anhydrous organic liquid medium.

14. The method of making triphenylphosphinedichloromethylene which comprises adding chloroform to a suspension of triphenyl phosphine and potassium t-butoxide in an inert anhydrous organic liquid hydrocarbon medium.

No references cited.